United States Patent
Franceschini et al.

(10) Patent No.: US 7,440,826 B2
(45) Date of Patent: Oct. 21, 2008

(54) STEERING AID SYSTEM FOR ALTITUDE AND HORIZONTAL SPEED, PERPENDICULAR TO THE VERTICAL, OF AN AIRCRAFT AND AIRCRAFT EQUIPPED THEREWITH

(75) Inventors: Nicolas Franceschini, Marseilles (FR); Franck Ruffier, Marseilles (FR); Stéphane Viollet, Marseilles (FR); Marc Boyron, Marseilles (FR)

(73) Assignee: Centre National de la Recherche Scientifque (C.N.R.S.), Paris (FR)

( * ) Notice: Subject to any disclaimer, the term of this patent is extended or adjusted under 35 U.S.C. 154(b) by 572 days.

(21) Appl. No.: 10/528,027

(22) PCT Filed: Aug. 29, 2003

(86) PCT No.: PCT/FR03/02611

§ 371 (c)(1),
(2), (4) Date: Nov. 4, 2005

(87) PCT Pub. No.: WO2004/025386

PCT Pub. Date: Mar. 25, 2004

(65) Prior Publication Data

US 2006/0138277 A1  Jun. 29, 2006

(30) Foreign Application Priority Data

Sep. 16, 2002 (FR) .................................. 02 11454

(51) Int. Cl.
*G05D 1/08* (2006.01)
*G06F 19/00* (2006.01)

(52) U.S. Cl. ............... 701/4; 701/8; 701/10; 244/17.13
(58) Field of Classification Search ..................... 701/3, 701/4, 8, 9, 10, 7, 18, 302; 344/17.13, 181, 344/182, 186
See application file for complete search history.

(56) References Cited

U.S. PATENT DOCUMENTS

| 3,927,306 | A | | 12/1975 | Miller |
| 3,994,455 | A | * | 11/1976 | Simpson ..................... 244/186 |
| 4,628,455 | A | | 12/1986 | Skutecki |
| 4,748,569 | A | | 5/1988 | Gordon |
| 6,785,594 | B1 | * | 8/2004 | Bateman et al. ................ 701/9 |

OTHER PUBLICATIONS

Doyle R S et al: "Multi-sensor data fusion for helicopter guidance using neuro-fuzzy estimation algorithms" Systems, Man and Cybernetics, 1995. Intelligent Systems for the 21st Century., IEEE International Conference on Vancouver, BC, Canada Oct. 22-25, 1995, New York, NY, USA, IEEE, US, Oct. 22, 1995, pp. 1392-1397, XP010194472 ISBN: 0-7803-2559-1.

* cited by examiner

*Primary Examiner*—Tan Q Nguyen
(74) *Attorney, Agent, or Firm*—Young & Thompson

(57) ABSTRACT

A steering aid system for altitude and horizontal speed of an aircraft (4) includes: a measuring device (22) for delivering a measured signal based on the aircraft altitude and horizontal speed, a common predetermined reference value (26) for the aircraft altitude and horizontal speed, and elements (20) for slaving the signal to the reference value by pitch loop, the elements being adapted to vary automatically the pitch and/or propulsive performance of the lifting members to lock the measured signal to the reference value.

12 Claims, 3 Drawing Sheets

STEERING AID SYSTEM FOR ALTITUDE AND HORIZONTAL SPEED, PERPENDICULAR TO THE VERTICAL, OF AN AIRCRAFT AND AIRCRAFT EQUIPPED THEREWITH

The invention relates to a steering aid system for controlling altitude and horizontal speed, perpendicular to the vertical, of an aircraft.

Today, whatever aircraft is being used, it is essential to avoid collisions with the ground. The pilot must therefore monitor and continuously control the altitude and horizontal speed of the aircraft. To do this, he may manipulate the pitch of the aircraft and/or the power developed by the aircraft's lifting means.

Pitch here refers to the angular displacement of the aircraft about an axis defined as being its transverse axis, that is, about an axis perpendicular to the axis about which roll displacements are made and to the axis about which yawing movements are made.

Pitch and the power developed by the lifting means are both parameters modifying altitude and horizontal speed. Piloting an aircraft therefore requires numerous hours of training in order to acquire the necessary dexterity for controlling these two parameters simultaneously. In order to help the pilot control these two parameters, automatic steering systems have been proposed. However, these systems are only capable of assisting the pilot during certain phases of attitude control such as, for example, steady-state flight or cruising flight at high altitude, and they are furthermore complex, bulky, heavy and expensive. This is because they generally comprise at least one first servoloop for controlling altitude and a second servoloop for controlling horizontal speed. These servo-loops are complicated to set up, since an action affecting horizontal speed has consequences for altitude, and vice versa.

The aim of the invention is to solve this problem by proposing a simpler steering aid system for controlling altitude and horizontal speed.

The subject of the invention is therefore a steering aid system for controlling altitude and horizontal speed, perpendicular to the vertical, of an aircraft, in which altitude and horizontal speed are controlled by varying the pitch of the aircraft and/or the power developed by the lifting means of the said aircraft, characterised in that it comprises:
a measuring device capable of delivering a measured signal as a function simultaneously of both the altitude of the aircraft and the horizontal speed of the aircraft;
an identical pre-set reference value for the altitude and the horizontal speed of the aircraft, this value being independent of variations in the said measured signal, and
means forming a servoloop for slaving the sensor signal to the said reference value, these means being capable of automatically varying the pitch and/or the power developed by the lifting means for the purpose of slaving the measured signal to the reference value.

The above-mentioned steering aid system regulates and controls pitch and/or the power developed by the lifting means on the basis of a single signal as a function simultaneously of both altitude and horizontal speed. Thus, by contrast with the existing systems, automatic and simultaneous control of the altitude and horizontal speed of the aircraft requires only one servoloop. The system described here is thus simpler than the known systems.

In accordance with other features of a system according to the invention:
the means forming a servoloop comprise:

a unit for controlling either only the pitch or only the power developed by the lifting means as a function of an input control, and
a subtractor capable of calculating the said input control from the difference between the said signal and the said reference value in such a way as to compensate for this difference,
the said measured signal is representative of the quotient of the horizontal speed divided by the altitude of the aircraft,
the measuring device comprises:
a first and a second sensor, each capable of measuring variations in a characteristic of the surface flown over, each sensor having a line of sight which is angularly offset by an angle $\Delta\phi$ from that of the other sensor, in such a way that the first and the second sensors successively measure an identical variation during a displacement of the aircraft, and a processing unit capable of calculating the time interval $\Delta T$ elapsing between measurement of a said variation by the first sensor and measurement of the same variation by the second sensor and of delivering, as a measured signal, a signal the value of which is a decreasing and monotonic function of this calculated time interval;
the signal delivered by the processing unit as a measured signal is representative of the quotient of the relative angular offset $\Delta\phi$ of the lines of sight divided by the calculated time interval $\Delta T$;
the said characteristic is the intensity of electromagnetic radiation within a spectral zone between the ultraviolet and the millimetric wavelengths emitted by the surface flown over;
the first and second sensors are in each case a photosensor;
the first and second sensors are associated with an automatic device for maintaining a constant orientation of each of the lines of sight relative to the perpendicular to the aircraft;
in the case of an aircraft wherein the power developed by the lifting means is modified by varying a collective step or an altitude control system of one or more rotating blade assemblies, this collective step being controllable, the control unit is capable of controlling the said collective step for controlling the power developed by the lifting means;
in the case of an aircraft wherein the power developed by the lifting means is modified by varying the speed of rotation of a rotating blade assembly, this speed of rotation being controllable, the control unit is capable of controlling the said speed of rotation for controlling the power developed by the lifting means;
in the case of an aircraft wherein pitch is modified as a function of the position of a controllable pitch motivator, the control unit is capable of controlling the said position of the pitch motivator.

A further subject of the invention is an aircraft, characterised in that it comprises a steering aid system according to the invention.

The invention will be better understood from reading the description below, which is provided solely by way of example and which refers to the drawings, wherein.

Figure 1:
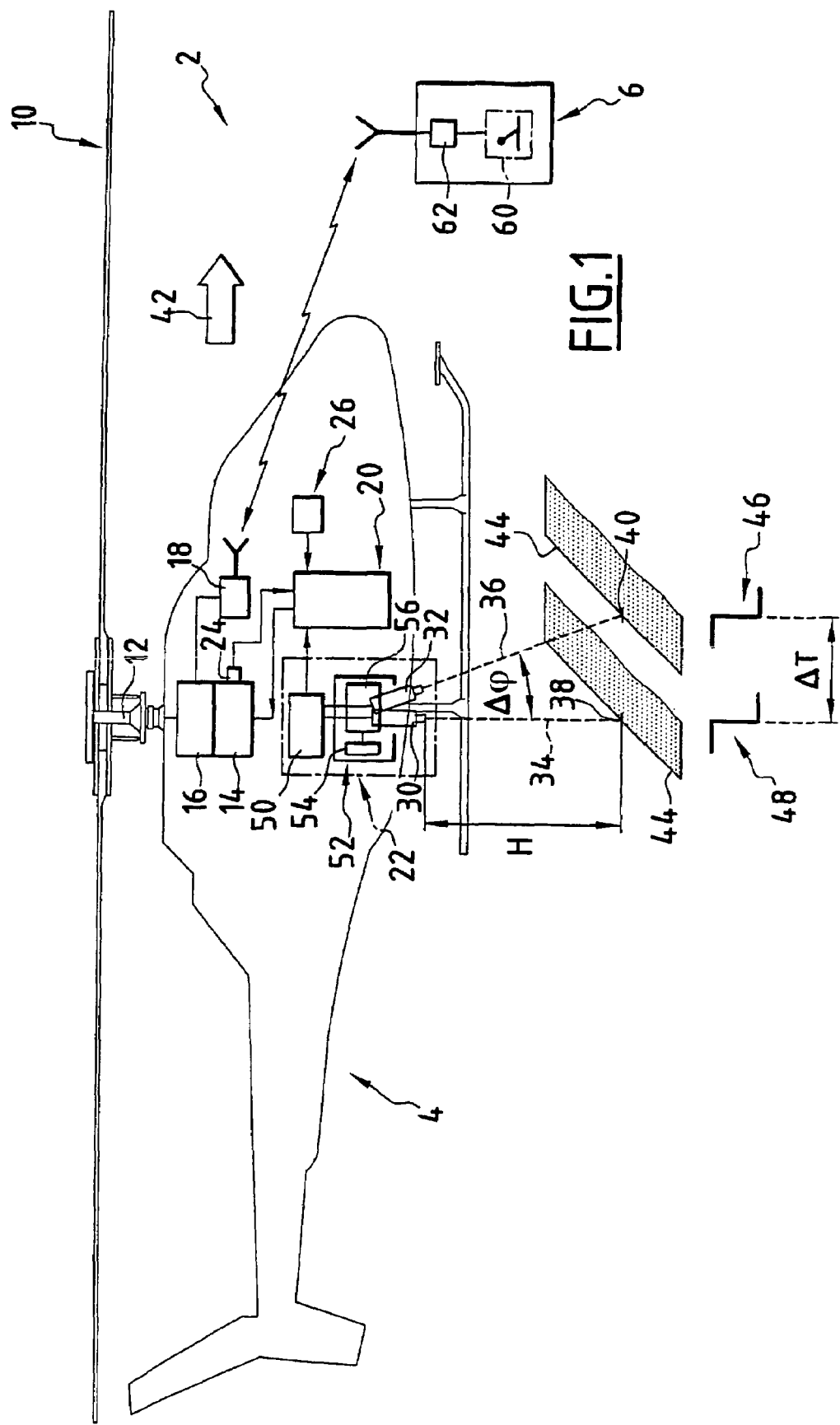
FIG. 1 is a schematic representation of the layout of a helicopter equipped with a steering aid system according to the invention.

FIG. 1 represents a steering aid system 2 for controlling the altitude and horizontal speed of an aircraft in the specific case in which this aircraft is a rotary-wing aircraft, here a helicopter 4, distantly remote-controlled with the aid of a steering unit 6.

The helicopter 4 is equipped with a rotating blade assembly 10 induced to rotate via the intermediary of a rotor 12 of an engine 14. The speed of rotation of the rotor 12 is controllable as a function of a speed set-point, in such a way as to vary the speed of rotation of the rotating blade assembly 10.

The helicopter 4 also comprises a mechanism 16 for controlling the pitch of the helicopter as a function of a pitch set-point. This mechanism 16 is capable of inclining the axis of rotation of the rotating blade assembly 10 relative to the horizontal direction in such a way as to create a non-zero horizontal acceleration. The term "horizontal" here refers to a direction perpendicular to the vertical or to the perpendicular to the helicopter 4.

The mechanism 16 is here connected to a radio receiver 18 for receiving a pitch set-point transmitted by the steering unit 6 and for delivering this received pitch set-point to the mechanism 16.

The helicopter 4 also comprises a control system 20 for controlling the altitude and horizontal speed of the helicopter, which control system is connected to a measuring device 22, a sensor 24 for measuring the speed of rotation of the rotor 12 and to a single set-point 26 for altitude and horizontal speed.

The measuring device 22, or motion detector 22, has the function of delivering to the control system 20 a signal which is a function of both the altitude and the horizontal speed of the helicopter 4. This measuring device 22 is known and will be only briefly described here. For further information on this device 22, the reader is referred, for example, to the following works:

Blanes, C: "Appareil visuel élémentaire pour la navigation "à vue" d'un robot mobile autonome", DEA de neurosciences, Université d'Aix-Marseille II, 1986;

Blanes, C: "Guidage visuel d'un robot mobile autonome d'inspiration bionique", doctoral thesis at the Institut Polytechnique, Grenoble, 1991.

The device 22 comprises, for example, uniquely two photosensors 30 and 32 each capable of measuring the light intensity at a single point on the surface flown over during displacement of the helicopter 4. These photosensors 30 and 32 are directional and are each associated with a single line of sight 34 and 36 respectively, both of which are directed towards the surface flown over. Sight points 38 and 40, positioned respectively at the intersection of the lines of sight 34 and 36 and the surface flown over, represent the points at which the light intensity diffused or emitted by the surface flown over is measured. Each sight point substantially corresponds to a pixel of a photo of the surface flown over, taken at the same altitude. The lines of sight 34 and 36 are positioned within the same perpendicular plane to the transverse axis about which the pitching of the helicopter 4 occurs. Moreover, these lines of sight 34 and 36 are angularly offset relative to one another by a constant angle $\Delta\phi$. This angle $\Delta\phi$ is selected such that the light intensity at every point on the surface flown over, which surface is measured by the sensor, is also measured a few moments later or a few moments earlier by the sensor 30, depending on whether the helicopter is advancing or reversing.

Here, the line of sight 34 is vertical, whereas the line of sight 36 is positioned more anteriorly in the direction of horizontal displacement of the helicopter 4 represented by an arrow 42 in FIG. 1.

In FIG. 1, the sight point 40 is represented here, in the simplified case in which it meets a sudden discontinuity 44 in the light intensity, for example a boundary between a light surface and a darker surface. The variation in light intensity measured by the photosensor 32 corresponding to this discontinuity 44 is represented, in FIG. 1, by a signal 46 shaped like a descending staircase, the descending front of which corresponds to the boundary between the lighter surface and the darker surface.

Similarly, the sight point 38 is represented at the instant when, after the helicopter has moved in the direction of the arrow 42, it meets the same light-intensity discontinuity 44. The variation in light intensity, measured by the photosensor 30 at that moment, is represented in FIG. 1 by a signal 48, identical to the signal 46. The time interval elapsing between the instant when the photosensor 32 measures the discontinuity 44 and the instant when the photosensor 30 measures this same discontinuity 44 is represented in FIG. 1 by an arrow separating the descending fronts of the signals 46 and 48.

In FIG. 1, the altitude H of the helicopter 4 is represented by an arrow separating the sight point 38 and the photosensor 30.

The measuring device 22, which is associated with photosensors 30 and 32, comprises a calculator 50 or processing unit 50 capable of delivering to the control system 20 the signal as a function of both the altitude and the horizontal speed of the helicopter 4. This calculator 50 is equipped for determining the time interval $\Delta T$ elapsing between the instant when one of the sensors 30, 32 measures a light-intensity discontinuity and the instant when the other sensor measures this same discontinuity, and for delivering the signal corresponding to the ratio $\Delta\phi/\Delta T$ to the control system 20. This signal $\Delta\phi/\Delta T$ is substantially described by the following equation:

$$\Delta\phi/\Delta T = \frac{V \times \Delta\phi}{H \times \tan g\Delta\phi}$$

where V is the horizontal speed of the helicopter 4.

For small angles $\Delta\phi$ between the lines of sight 34, 36, the following is obtained:

$$\Delta\phi/\Delta T \approx V/H [\text{rad/s}]$$

In what follows, this signal $\Delta\phi/\Delta T$ will be called the angular speed. This is the mean relative speed (expressed in radians per second) of a contrast on the ground, viewed from the point of intersection of the optical axes of the photosensors 30 and 32.

In the embodiment described here, the photosensors 30 and 32 are associated with a device 52 for maintaining a constant position of the lines of sight 34 and 36 relative to the perpendicular to the helicopter 4, whatever the pitch of the said helicopter. For example, this device 50 is composed of a vertical gyroscope connected to a servomotor 56.

The gyroscope or horizon detector 54 is equipped for supplying the servomotor 56 with a signal indicating where the vertical is.

The servomotor 56 is capable, in response to this signal, of rotating the photosensors 30 and 32 in such a way as to keep the line of sight 34 aligned on the vertical. Thus, the measurements made by these photosensors 30 and 32 are independent of the pitch of the helicopter 4.

The set-point 26, connected to the control system 20, is a set-point of angular speed. Thus, when the helicopter advances at a constant speed V, the set-point 26 imposes a constant altitude H relative to the surface flown over. This imposed altitude may be considered a "safety altitude", as it increases with increasing machine speed. The set-point 26 is here a constant and independent of variations in the signal delivered by the measuring device 22.

In this embodiment, the control system 20 has the sole function of controlling the speed of rotation of the rotor 12 to maintain an altitude corresponding to the set-point 26. This control system 20 will be described with reference to FIG. 2.

The steering unit 6 comprises an operating handle 60 for controlling the pitch of the helicopter 4, which operating handle is connected to a radio transmitter 62 equipped for transmitting the pitch set-point corresponding to the position of the operating handle 60 to the receiver 18 of the helicopter 4.

Figure 2:
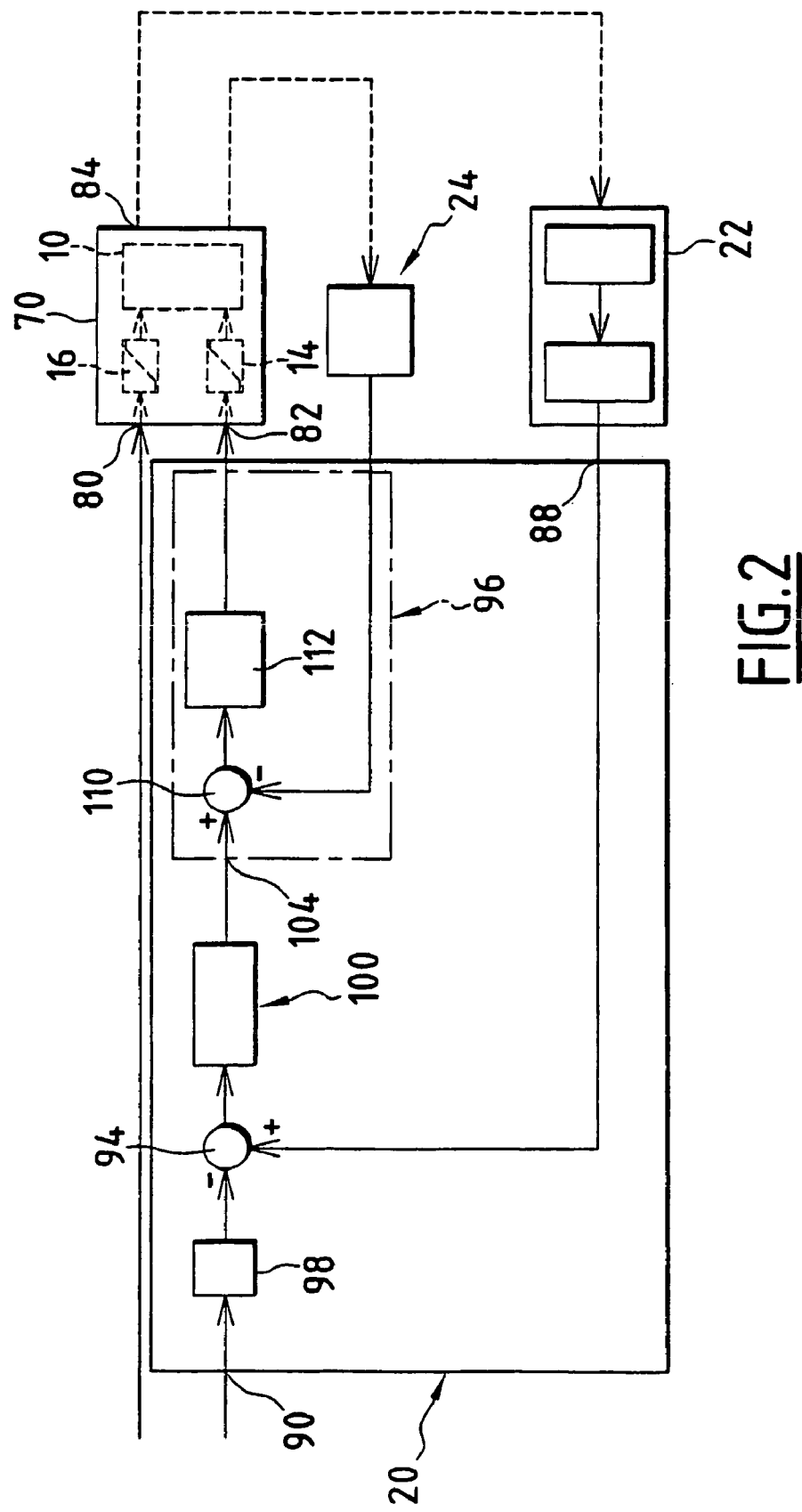
FIG. 2 is a schematic representation of a system for controlling the altitude and the horizontal speed of the helicopter in FIG. 1.
Figure 3:
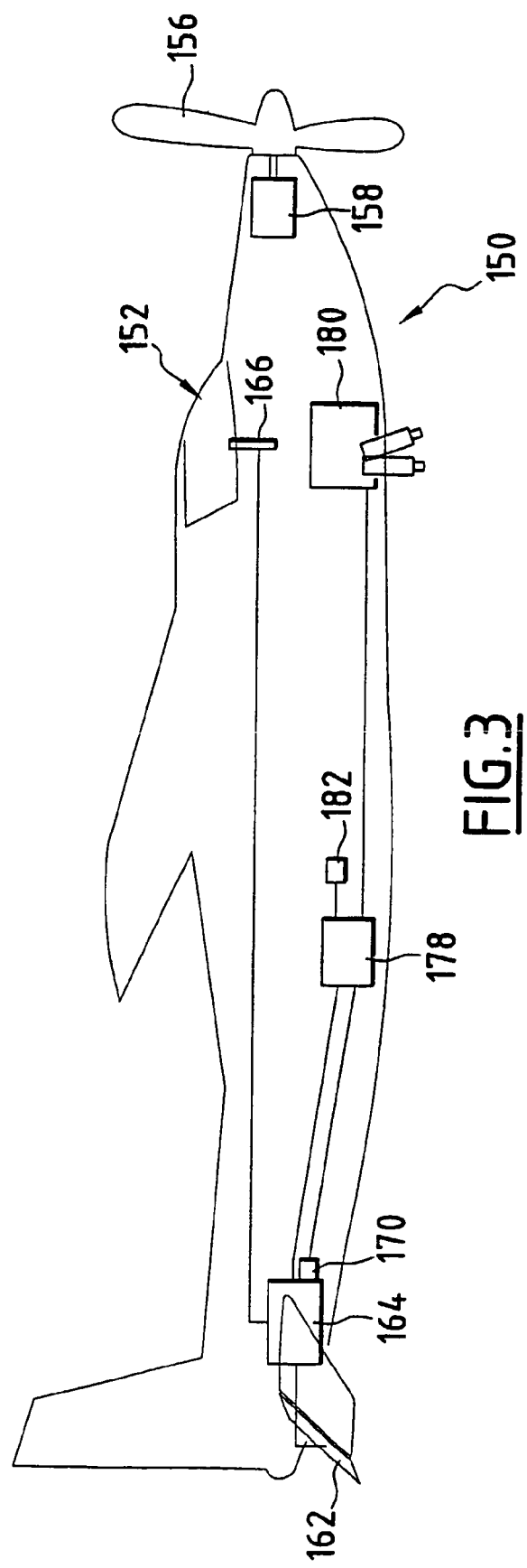
FIG. 3 is a schematic representation of the layout of an aeroplane equipped with a steering aid system according to the invention.

FIG. 2 is a block diagram corresponding to the steering aid system of FIG. 1. In this block diagram, the blocks corresponding to elements already described with the reference to FIG. 1 bear the same reference numbers.

A block 70 combining the engine 14, the mechanism 16 for pitch control, and the rotating blade assembly 10 admits two input controls 80 and 82 corresponding respectively to the pitch set-point transmitted by the receiver 18, and the speed set-point of the rotor transmitted by the control system 20 to the engine 14. This block 70 also comprises an output 84, representing the altitude and horizontal speed of the helicopter 4, obtained as a function of the input controls 80 and 82. This output 84 is connected by a chain-dotted arrow to the measuring device 22, to indicate that it is this altitude and this horizontal speed which are measured by this measuring device 22.

The measuring device delivers the measured angular speed to an input 88 of the control system 20.

The control system 20 comprises another input 90 via which the set-point 26 for the angular speed is received.

The control system 20 contains a subtractor 94 connected to a control unit 96 for controlling the speed of the rotor 12, forming, when they are connected to the measuring device 22, a single servoloop for slaving the angular speed of the helicopter 4 to the set-point 26.

Here, the subtractor 94 is equipped for determining the difference between the angular speed measured via the intermediary of the input 88 and the set-point 26 received by the input 90 for building a control signal for controlling the unit 96. To this end, the subtractor 94 comprises a negative pole connected via the intermediary of a scaling block to the input 90, a positive pole connected directly to the input 88, and an output connected to the input of a controller having proportional and derived action, or a PD controller. This controller 100, positioned upstream of the servoloop for slaving the angular speed, is known and is regulated by conventional means for the purpose of stabilising the system by improving the dynamics.

The controller 100 works out a set-point for the speed of the rotor 12 to be applied to make up the difference between the set-point 26 for the angular speed, and the measured angular speed. The set-point for the speed of the rotor 12 is connected to an input 104 of the control unit 96.

The control unit 96 has the function of slaving the speed of the rotor 12 to the speed set-point received at the input 104.

To this end, the control unit 96 comprises a secondary servoloop formed with the aid of a subtractor 110 and a controller 112 having proportional, integral and derived action, or a PID controller.

The subtractor 110 is capable of establishing the difference between the speed set-point received at the input 104 and the speed of the rotor 12 measured by the sensor 24. In FIG. 2, this sensor 24 is connected to an output of the block 70 by a dotted line, to indicate that this sensor measures the effective speed of the rotor 12.

An output of the subtractor 110 delivers, to the input of the PID controller 112, the signal corresponding to the difference between the speed reference value of the rotor and its measured speed.

The PID controller 112 is known and is regulated in a conventional manner so as to stabilise the loop for slaving the speed of the rotor 12 and to improve the dynamics of this loop. An output from this controller 112 is connected to the input of the engine 14 and forms the speed control 82.

The control system 20 and the measuring device 22 are constructed in a conventional manner, with the use of known electronic components. The electronic components are advantageously grouped to achieve greater compactness and low weight, of the order of $\frac{1}{10}$ of a gram.

The operation of the helicopter 4 shown in FIGS. 1 and 2 will now be described.

During the operation of the control system 20, two situations may arise.

The first situation corresponds to the case in which the angular speed measured by the measuring device 22 exceeds the set-point 26. In this situation, the difference, established by the subtractor 94, between the measured angular speed and the set-point 26 is positive. Following correction by the controller 100, this positive difference corresponds to a set-point for the increase in the speed of rotation of the rotor 12 transmitted to the input 104 of the control unit 96. In response to this set-point for the increase in the speed of the rotor 12, the control unit 96 commands the engine 14 to increase the speed of rotation of the rotor 12 and slaves this speed to the speed set-point received at the input 104 via the intermediary of the servoloop formed by the sensor 24, the subtractor 110 and the controller 112. An increase in the speed of rotation of the rotor 12 will result in a marked increase in altitude, accompanied by a slight increase in the horizontal speed of the helicopter 4. Overall, this results in a decrease in the angular speed measured by the measuring device 22. Thus, the difference between the set-point 26 and the measured angular speed decreases, this being expressed as a decrease in the rotor-speed set-point transmitted to the input 104. This loop adjustment of the rotor speed continues until a steady-state regime is established. In the steady state, the measured angular speed is substantially constant and equal to the angular-speed set-point 26.

In the converse situation, when the measured angular speed is less than the set-point 26, the difference identified by the subtractor 94 is negative. Following correction by the controller 100, this negative difference corresponds to a set-point for decrease in the speed of rotation of the rotor 12 transmitted to the input 104 of the control unit 96. In response to this set-point for decrease in the speed of rotation of the rotor 12, the unit 96 controls the engine 14 and reduces the rotation speed of the rotor 12. A decrease in the speed of rotation of the rotor 12 will result in a marked decrease in altitude, accompanied by a slight decrease in the horizontal speed of the helicopter 4. Overall, this results in an increase in the angular speed measured by the measuring device 22. This increase in the measured angular speed is expressed as a difference identified by the subtractor 94 of smaller modulus but still negative. This new difference identified by the subtractor 94 is translated into a command for a decrease in the speed of the rotor 12 of smaller modulus, and thus into a smaller decrease in the speed of the rotor 12, to return gradually to a steady-state regime corresponding to a substantially constant measured angular speed.

Thus, the altitude and horizontal speed of the helicopter 4 are automatically controlled by a single servoloop for slaving the angular speed of the helicopter 4, which servoloop is formed by the measuring device 22, the subtractor 94, and controller 100 and the control unit 96.

The procedure for steering the helicopter 4 equipped with the control system 20 is as follows. The procedure begins with a step of initialisation of the set-point 26, for example, at the time of installation of the control system 20 in the helicopter 4. Once initialised, this set-point 26 is not modified again during navigational operations of the helicopter 4.

An operative then puts the helicopter 4 into initial lift. For example, an operative activates the engine 14 which, in the case of the helicopter 4, leads to take-off along the vertical of the helicopter 4. With the aid of the steering unit 6, the operative then transmits a set-point for initial pitch to the helicopter 4. In response to this set-point, the mechanism 16 displaces the rotating blade assembly 10 from its original horizontal position into a slightly tilted position relative to this horizontal position.

As soon as the rotating blade assembly 10 is tilted slightly relative to the horizontal and the helicopter 4 has begun to move horizontally, the sequence of take-off operations of the helicopter 4 takes place entirely automatically due to the control system 20, without further intervention by the operative. Just after take-off, the altitude of the helicopter 4 is in fact low relative to the horizontal speed, and the angular speed delivered by the device 22 is thus greater than the set-point 26. In these conditions, as described above, the control system 20 commands the engine 14 to increase the rotation speed of the rotor 12 and thus to increase the altitude of the helicopter 4 until a steady-state regime is established.

When this steady-state regime has been established, as long as the pitch set-point is not modified by the operative, and as long as the surface flown over is flat and the horizontal speed of the helicopter is not disturbed, the set-point 26 corresponds to constant altitude and a constant horizontal speed.

If the helicopter 4 flies over a prominent obstacle, the apparent altitude H decreases, which is translated into an increase in the measured angular speed. Consequently, the control system 20 increases the rotation speed of the rotor 12 to increase the altitude and thus restore the set-point angular speed 26. Thus, following a brief transitional phase, the helicopter 4 flies over the prominent obstacle while maintaining a constant altitude relative to this obstacle. Similarly, when the helicopter flies over a hollow, the altitude increases, which leads to a decrease in the measured angular speed, and the control system 20 then commands a decrease in the speed of the rotor 12 and thus a decrease in the altitude H, to return to the set-point 26.

Thus, the control system 20 herein described allows the altitude of the helicopter 4 to be automatically adjusted to the relief of the surfaces flown over. In particular, all collisions with an underlying obstacle are automatically avoided.

Whilst the altitude of the helicopter 4 is no longer disturbed by external elements, its horizontal speed is so disturbed. For example, if a tailwind blowing in the direction of the arrow 42 increases the horizontal speed of the helicopter 4, this is translated as an increase in the measured angular speed, which will result in an increase in the speed of the rotor 12 by the control system 20. Thus, in the event of a tailwind, the helicopter 4 automatically increases its altitude, maximising navigational safety by this alone. Indeed, the higher the horizontal speed of the helicopter, the more difficult it would be to avoid close obstacles. Hence the advantage of a safety altitude which increases automatically with increasing speed.

In the converse situation, that is, if the helicopter is subjected to a headwind, its horizontal speed decreases, with a corresponding decrease in the measured angular speed. The control system 20 then automatically commands the engine 14 to reduce the speed of rotation of the rotor 12, the effect of which is a decrease in altitude. Thus, in the event of a strong headwind, the helicopter 4 simultaneously reduces its horizontal speed and its altitude, which may cause it to land. Such landings are not dangerous, as they occur at zero horizontal speed at the very moment ground is reached.

Finally, the angular speed measured by the device 22 may also result in operative intervention. For example, the operative may decide, in the course of navigation, to modify the pitch set-point progressively with the aid of the steering unit 6. For example, if he increases the inclination of the rotating blade assembly 10 relative to the horizontal, this simultaneously leads to an increase in the horizontal speed of the helicopter and to a decrease in altitude, i.e. substantially to an increase in the measured angular speed. Consequently, under these conditions, the control system 20 commands the engine 14 so as to increase the speed of the rotor 12, which leads above all to an increase in the altitude of the helicopter 4 until it returns to the original set-point 26 for angular speed.

Conversely, that is, if the operative transmits a pitch set-point to reset the rotating blade assembly to the horizontal, the horizontal speed decreases and the control system 20 then automatically reduces the speed of the rotor 12 to decrease the altitude to a value of zero when the horizontal speed of the helicopter 4 is zero. The operative thus performs a landing operation of the helicopter 4 by controlling only the pitch thereof.

Thus the system 2 considerably simplifies the control of a helicopter, since the operative piloting it now has only to controlling a single parameter—here the pitch of the helicopter—to land, take off, accelerate or decelerate.

FIG. 4 represents a steering aid system 150 for the altitude and horizontal speed of a conventional aeroplane 152. This aeroplane 152 is equipped with a propeller 156 associated with aerofoils, which propeller 156 is induced to rotate by an engine 158 of adjustable rotation speed.

The aeroplane 152 also comprises a rotatable pitch motivator 162, the function of which is to control the pitch of the aircraft. This pitch motivator 162 is actuated by an actuator 164 connected to a control lever 166 of the pitch motivator, which is located in the cock-pit of the aeroplane. A sensor 170 of the position of the pitch motivator 162 is similarly associated with this pitch motivator 162 for slaving of the position.

Finally, the aeroplane 152 is equipped with a control system 178 connected to the sensor 170, to the actuator 164, to a measuring device 180 and to a constant safety set-point 182.

The measuring device 180 is identical to the measuring device in FIG. 1.

The set-point 182 is constant and is initialised to a value corresponding to a safety altitude below which the aeroplane 152 must not descend if its speed exceeds a hazardous speed. This set-point corresponds to a constant value of the angular speed.

The control system 178 has the function of automatically controlling the pitch motivator 162 to automatically monitor the altitude and horizontal speed of the aeroplane. This control system 178 is, for example, identical to the control system 20 of FIG. 1, except for the fact that it is only activated when the angular speed measured by the device 180 exceeds the set-point 182.

In this embodiment, as long as the angular speed measured by the device 180 is below the set-point 182, the control system 178 remains inactive and only the pilot controls the rotation speed of the propeller 156 and the pitch motivator 162.

In the event of a prominent obstacle in the trajectory of the aeroplane, the altitude H above the obstacle is suddenly reduced relative to its former value, while the horizontal speed of the aeroplane remains substantially constant. This corresponds to a sudden increase in the angular speed. When the angular speed exceeds the set-point 182, the control system 178 takes control of the aeroplane and automatically monitors the pitch motivator 162. As the angular speed of the aeroplane exceeds the set-point 182, the control system 178 instructs the pitch motivator to reduce the angular speed. Here, the control system 178 therefore instructs the actuator 164 to start the pitch motivator rotating in a skyward direction, which will lead to an increase in altitude as well as a reduction in the horizontal speed of the aeroplane. The measured angular speed is therefore reduced for these two reasons: The control unit then instructs this pitch motivator 162 to slave the measured angular speed to the set-point 182.

Thus, with the aid of the system 150, as long as the pilot does not resume control of the aeroplane, the control system 178 returns the aeroplane to a safe height and avoids all collisions with obstacles.

Then, in order to regain control of the aeroplane 152, the pilot must carry out operations leading to a reduction in the angular speed to below the set-point 182. For example, the pilot manoeuvres the control lever in such a way as to increase the altitude of the aeroplane or to reduce the rotation speed of the propeller 156. Once the manoeuvres of the pilot have brought the measured angular speed to below the set-point 182, the control system 178 is deactivated again to allow the pilot to manoeuvre the aeroplane.

Thus, in this embodiment, the steering aid system 150 is used as a safety system enabling collisions of the aeroplane with the ground to be avoided.

The system of FIG. 1 has been described in the particular case in which the control system 20 controls the speed of the rotor 12 so as to slave the measured angular speed to a set-point. In a variation embodiment, the control system 20 is adapted for automatic control of the pitch of the aircraft so as to slave the measured angular speed to a set-point. In this variation, the means forming a servoloop are, for example, identical to those in FIG. 1 with the exception of the unit 96 for controlling the speed of the rotor, which unit has been replaced with a unit for controlling the pitch of the aircraft. Thus, in this variant, steering of the aircraft by an operative now consists in transmitting rotation-speed set-points, rather than pitch set-points.

The system has been described in the simplified case of sudden discontinuities 44 of the light intensity diffused by the surface flown over. In reality, the discontinuities 44 replaced by gradual variations in the light intensity diffused by the surface flown over. In this situation, the variations in light intensity measured by the photosensors are gradual and correspond to a gradient or a rate of variation of the measured characteristic.

The example device for measuring the angular speed has here been described in the particular case where it comprises only two photosensors. In a variation embodiment, however, the device for measuring the angular speed comprises at least three photo-sensors so as to increase the precision of the measurements and the visual field. These photosensors may belong to a bar or to a matrix of photosensitive elements.

For the purpose of anticipating obstacles positioned in the aircraft's trajectory, in a variation embodiment the lines of sight 34 and 36 of the photosensors are both inclined towards the front of the aircraft, in order that the sight points 38 and 40 are further orientated in the direction of its displacement. Thus, in this variant, an obstacle is detected more rapidly and the control system reacts sooner.

Here, the steering aid system has been described solely in the cases of a helicopter and an aeroplane. However, a steering system of this type is applicable to any system capable of displacement above a surface without direct contact therewith. For example, the system described here is equipped for assisting with the steering or remote steering of various vehicles, such as airships, hot-air balloons, all types of helicopter equipped with one or more rotating blade assemblies, and all types of aeroplane and drone and microdrone aerial vehicles. This system is also equipped for assisting with the navigation of sub-marines and manned or unmanned space missiles. In the case of submarines, altitude relates to the depth of the aqueous medium of a sea, a lake or a river, whilst in the case of space missiles, altitude relates to the distance separating the missile from a space object such as a planet, a satellite (natural or man-made), a space probe, an asteroid or a comet.

The system 2 has here been described in the particular case in which the pitch of the helicopter 4 was being remote-controlled by an operative and the power generated by the lifting means 156 was under the control of a pilot. However, in a variation embodiment, the parameter, selected from the pitch and the power generated by the lifting means, which is not automatically controlled by a control unit such as the control system 20 is either:

controlled by a pilot on board the aircraft;
distantly remote-controlled by an operative, or
controlled automatically on the basis of signals originating from additional sensors provided within the aircraft, such as proprioceptive systems or sight systems.

In another variant embodiment, the angular speed set-point 26 or 182 is replaced by a set-point which is regulable and controllable by an operative and/or a pilot, or on the basis of signals from other on-board sensors.

In a variation embodiment, the calculator is replaced by a purely numerical or analog processing system, or by a system hybridising the purely numerical solution and the purely analog solution.

In yet another variation embodiment, the discontinuities or gradients in the radiance of the surface flown over relate, not to the humanly-visible spectrum, but to the infrared, ultraviolet or millimetric wavelengths. The radiance of the surface flown over may be the result of lighting by a natural source or to the projection of radiation from the craft.

Finally, it is important to bear in mind that the system described necessitates no direct measurement of either altitude or horizontal speed of the machine relative to the surface flown over. The simplicity and the low rated load of the system described, which are synonymous with lightness, compactness and low cost, predestine it for use in all aerospatial or submarine craft, and even in small, pilotless craft known as "drones", "micro-drones" or "micro-aircraft".

The invention claimed is:

1. A steering aid system for controlling altitude and horizontal speed, perpendicular to the vertical, of an aircraft (4; 152), in which altitude and horizontal speed are controlled by varying the pitch of the aircraft and/or the power developed by the lifting means (10; 156) of the said aircraft, wherein it comprises:

a measuring device (22; 180) capable of delivering a measured signal as a function simultaneously of both the altitude of the aircraft and the horizontal speed of the aircraft;

an identical pre-set reference value (26; 182) for the altitude and the horizontal speed of the aircraft, this value being independent of variations in the said measured signal, and means (20; 178) forming a servoloop for slaving the signal to the said reference value, these means being capable of automatically varying the pitch and/or the power developed by the lifting means for the purpose of slaving the measured signal to the reference value.

2. A system according to claim 1, wherein the means (20; 178) forming the servoloop comprise:

a unit (96) for controlling either only the pitch or only the power developed by the lifting means (10; 156) as a function of an input control, and a subtractor (94) capable of calculating the said input control from the difference between the said signal and the said reference value in such a way as to compensate for this difference.

3. A system according to claim 2, for an aircraft wherein the power developed by the lifting means is modified by varying an altitude control system of one or more rotating blade assemblies, this altitude control system being controllable, wherein the control unit is capable of controlling the said altitude control system for controlling the power developed by the lifting means.

4. A system according to claim 2, for an aircraft (4) wherein the power developed by the lifting means is modified by varying the speed of rotation of a rotating blade assembly (10), this speed of rotation being controllable, wherein the control unit is capable of controlling the said speed of rotation for controlling the power developed by the lifting means.

5. A system according to claim 2, for an aircraft (152) wherein pitch is modified as a function of the position of a controllable pitch motivator (162), wherein the control unit (96) is capable of controlling the said position of the pitch motivator (162)

6. A system according to claim 1, wherein the said measured signal is representative of the quotient of the horizontal speed divided by the altitude of the aircraft.

7. A system according to claim 6, wherein the measuring device comprises:

a first and a second sensor (30, 32), each capable of measuring variations (44) in a characteristic of the surface flown over, each sensor having a line of sight (34, 36) which is angularly offset by an angle $\Delta\phi$ from that of the other sensor, in such a way that the first and the second sensors (30, 32) successively measure an identical variation during a displacement of the aircraft, and a processing unit (50) capable of calculating the time interval $\Delta T$ elapsing between measurement of a said variation by the first sensor and measurement of the same variation by the second sensor and of delivering, as a measured signal, a signal the value of which is a decreasing and monotonic function of this calculated time interval.

8. A system according to claim 7, wherein the signal delivered by the processing unit as a measured signal is representative of the quotient of the relative angular offset $\Delta\phi$ of the lines of sight (34, 36) divided by the calculated time interval $\Delta T$.

9. A system according to claim 7, wherein the said characteristic is the intensity of electromagnetic radiation within a spectral zone between the ultraviolet and the millimetric wavelengths emitted by the surface flown over.

10. A system according to claim 9, wherein the first and second sensors (30, 32) are in each case a photosensor.

11. A system according to claim 7, wherein the first and second sensors (30, 32) are associated with an automatic device (52) for maintaining a constant orientation of each of the lines of sight relative to the perpendicular to the aircraft.

12. An aircraft, wherein it comprises a steering aid system according to claim 1.

* * * * *